June 2, 1942. H. F. COX, JR., ET AL 2,284,641
HEATING AND CONVEYING MECHANISM
Filed March 15, 1938 2 Sheets-Sheet 1

INVENTORS
Herbert F. Cox, Jr.
Howard M. Hill
BY
Charles H. Crone
ATTORNEYS

June 2, 1942.  H. F. COX, JR., ET AL  2,284,641
HEATING AND CONVEYING MECHANISM
Filed March 15, 1938  2 Sheets-Sheet 2
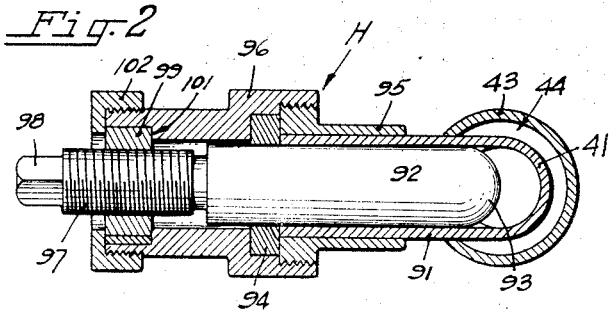
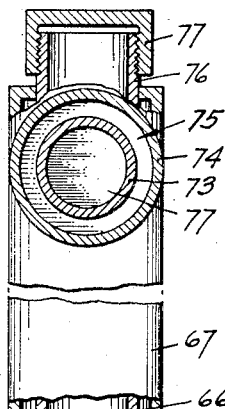
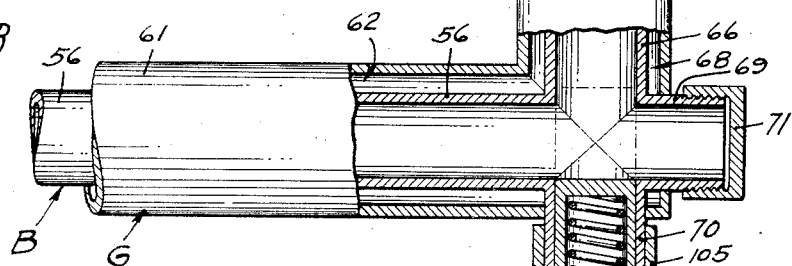
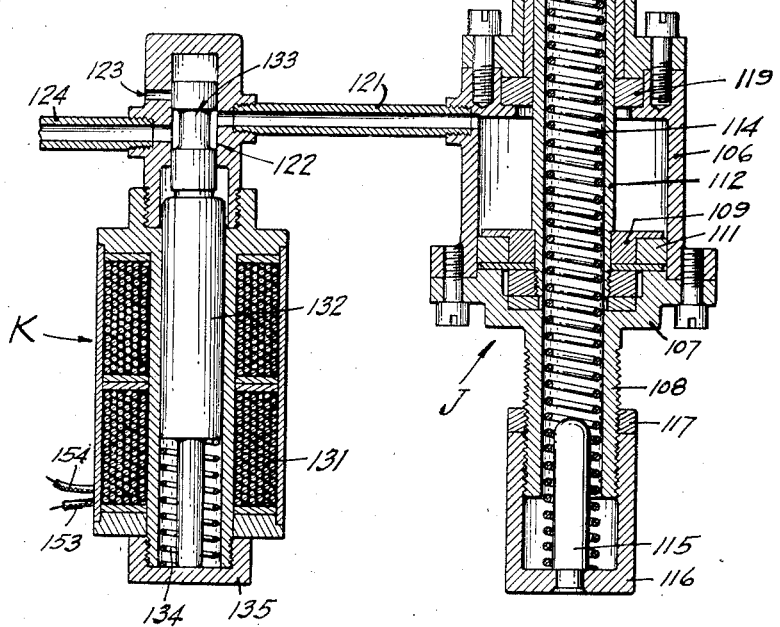

Patented June 2, 1942

2,284,641

UNITED STATES PATENT OFFICE 2,284,641

HEATING AND CONVEYING MECHANISM

Herbert F. Cox, Jr., Madison, N. J., and Howard M. Hill, Bayside, N. Y., assignors to American Can Company, New York, N. Y., a corporation of New Jersey Application March 15, 1938, Serial No. 196,090

10 Claims. (Cl. 91—51)

The present invention relates to a mechanism for maintaining thermoplastic adhesive at a predetermined temperature and in liquid form while conveying the same from place to place and has particular reference to an adhesive supply tank and its connecting pipe line both encased in heating jackets and provided with improved valves for controlling the flow of adhesive therethrough.

In the manufacture of various articles including containers or cans made from fibrous sheet material or the like, thermoplastic adhesives are often used in the joints and such adhesives must be applied while hot and while of liquid consistency. It is difficult to convey such heated adhesive any distance as through pipe lines, for example, from one machine to another, because of heat losses and consequent hardening of the adhesive. Solidification of the adhesive clogs the pipe line, renders it useless and at times may involve the replacement of the entire line.

The instant invention contemplates overcoming this difficulty by providing a special form of adhesive supply tank and easily opened pipe sections with a system of heating jackets disposed around the adhesive supply tank and around the pipe line so that the adhesive in some cases may be melted in the tank but whether melted there or received in liquid form will be maintained at a predetermined temperature both within the tank and while flowing through the pipe and the invention further contemplates a control of flow of the adhesive through the pipe line.

An object, therefore, of the invention is the provision of a heat maintaining supply tank and its connecting pipe line for conveying a heated thermoplastic adhesive over distances and in liquid form at a predetermined temperature wherein the tank and the pipe line are surrounded by heating jackets through which a heating medium is circulated.

Another object is the provision of such a supply tank and pipe line wherein the adhesive passes through angular portions of the line without clogging and without interference in its normal flow.

A further object is the provision of a supply tank and pipe line which may be readily cleaned out.

Another object is the provision in such a pipe line of an automatic shut-off valve for preventing flow of adhesive through the line when a machine using the adhesive stops operating, the adhesive while trapped in the line being held at a predetermined temperature to maintain its liquid condition and to avoid solidification.

Numerous other objections and advantages of the invention will be apparent as it is better understood from the following description, which, taken in connection with the accompanying drawings, discloses a preferred embodiment thereof.

Referring to the drawings:

Fig. 2 is an enlarged sectional view taken substantially along the line 2—2 in Fig. 1; and Fig. 3 is an enlarged sectional view taken substantially along the line 3—3 in Fig. 1.

Figure 1:
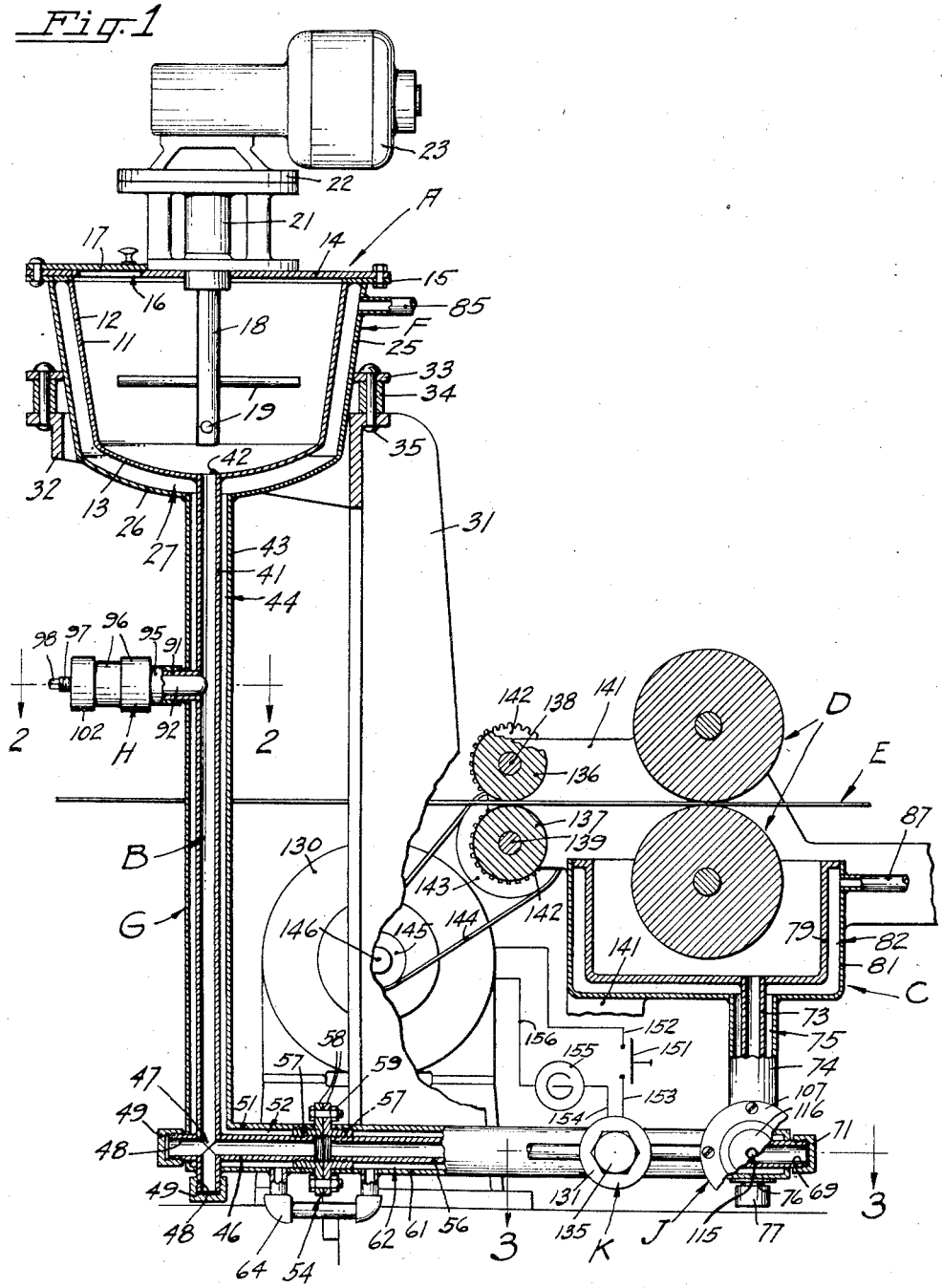
Figure 1 is a side view, part in elevation and part in section, of an apparatus embodying the instant invention, and including a wiring diagram of the electric apparatus used.

As a preferred embodiment of the invention the drawings disclose an adhesive supply tank A connected by a pipe line B to a suitable adhesive applying mechanism C. By way of example, the mechanism C includes a pair of rollers D one of which rotates in a bath of the adhesive supplied by the tank A. A strip or web E of material to be coated is passed between the rollers.

Heated liquid or semi-liquid thermoplastic adhesive will in most cases be introduced into the supply tank A in any suitable manner and is then supplied as a liquid to the applying mechanism C as required. While in the supply tank and while flowing through the pipe line to the applying mechanism the hot adhesive is maintained at a predetermined temperature by a fluid heating medium such as steam, hot water, hot oil, or the like. This fluid medium is circulated through suitable heating jackets F, G which are provided around the supply tank and the pipe line respectively. These jackets prevent cooling and solidifying of the adhesive.

The amount of flow of the heated adhesive from the supply tank A is manually controlled by a regulating valve H which is located in the pipe line B adjacent the supply tank. This valve may be adjusted so that a predetermined quantity of adhesive will always be on hand in the applying mechanism while at the same time preventing an excess of adhesive to accumulate.

An automatic shut-off valve J is also provided in the pipe system and is located adjacent the applying mechanism C. This valve is preferably operated by compressed air, controlled electrically by a solenoid actuated auxiliary or pressure fluid valve K. Auxiliary valve K in its turn is affected by conditions in the applying mechanism C. These two valves J and K collectively cut off the flow of adhesive through the pipe line B when the applying mechanism stops and collectively restore normal passage of the adhesive through the line when the mechanism is again started.

The supply tank A preferably comprises a cup shaped vessel 11 having tapering side walls 12 and an integral curved bottom wall 13. At the top the vessel walls 12 are welded to a ring 14. A top plate 15 is preferably bolted to the ring and closes the supply tank at the top. The top plate is provided with an opening 16 through which the adhesive, as a hot liquid, a semi-liquid, or solid may be introduced into the vessel. A pivoted cover plate 17 normally closes the opening.

If the solid form of adhesive is put into the vessel 11 considerable time and heat may be required to melt it. It is therefore better practice to first heat and melt the adhesive in some suitable manner and then pour it into the vessel while hot.

Adhesive in the vessel 11 when in melted form is preferably agitated while it is held in storage preparatory to being transferred. This agitation is effected by a stirring instrumentality comprising a rotatable shaft 18 which extends down into the adhesive and which carries a pair of angularly disposed horizontal stirring rods 19. The upper end of the shaft is journaled in a bearing 21 of a speed reduction mechanism of any suitable design generally indicated by the numeral 22. An electric motor 23 carried on the mechanism is utilized to drive the latter and through it the stirring shaft 18.

The supply tank heating jacket F fits around the outside of the vessel 11 and is therefore of substantially the same shape as the vessel. For this purpose the jacket is formed with tapering side walls 25 which at their lower edges merge into a curved bottom wall 26. These walls are spaced away from the vessel walls 12, 13 and thus provide a jacket space 27 through which the heating fluid is circulated. At their upper edges the jacket side walls 25 are welded to the ring 14.

The supply tank unit is supported by a vertically disposed bracket 31 which in the form shown in Fig. 1 rests on the floor. At its upper end the bracket is provided with an annular extension 32 which carries a ring 33 held above the bracket extension by spacer blocks 34. The ring is secured to the bracket extension by rivets 35 which extend through the spacer blocks. Ring 33 encircles the heating jacket side walls 25 and thus provides a seat into which the supply tank fits.

The pipe line B which conveys the adhesive from the supply tank A to the applying mechanism C preferably includes a vertical pipe section 41 (Fig. 1) the upper end of which is secured to the curved bottom wall 13 of the vessel 11 adjacent an opening 42 provided therein. This pipe section is surrounded by a tubular jacket 43 which constitutes a section of the heating jacket G. The jacket is spaced away from the pipe section to provide a heating space 44. The upper end of the jacket G is secured to the bottom wall 26 of the supply tank jacket F.

The vertical pipe section 41 adjacent its lower end intersects and is connected with a horizontal pipe section 46 in a cross joint 47, the adjacent ends of the pipe sections projecting beyond the joint as extensions 48. These extensions are fitted with removable caps 49. This construction of joint permits free passage of adhesive from one pipe section to the other during its normal use. At the same time it allows for exterior communication with each pipe section individually so that both may be emptied and readily cleaned out when the caps are removed.

The horizontal pipe section 46 is surrounded by a spaced tubular jacket 51 which provides a heating space 52. The adjacent ends of the heating jackets 43, 51 are joined together in any suitable manner, preferably by welding so that the heating spaces of the respective jackets are in communication with each other and so that only a minimum short section of the extensions 48 with their caps 49 are exposed to the outside.

In conveying the adhesive some distance through the pipe line, two or more continuing and connecting lengths or sections of pipe may be required. For best results these pipe sections and their enclosed heating jackets are connected in a self supporting manner. By way of example the horizontal pipe line under discussion is shown as composed of two sections in which there is incorporated a joint 54 which has been found suitable for holding together adjacent ends of the pipe sections and jackets.

In such a joint the free end of the pipe section 46 and the adjacent end of a continuing pipe section 56 are welded onto hubs 57 of flange plates 58. The flange plates are secured together by bolts 59. A clear passageway is thus provided through the connecting pipe sections for free movement of the adhesive.

The free end of the heating jacket 51 is supported on the outer surface of the flange hub 57 of the pipe section 46 and is welded thereto, while the adjacent end of a heating jacket 61 which surrounds the continuing pipe section 56 is likewise supported and welded on the outer surface of its flanged hub 57. Communication between the heating space 52 of jacket 51 and a heating space 62 of jacket 61 is effected around the flange joint 54 by way of a by-pass 64. One end pipe of the by-pass is connected into the jacket 51 while the other end pipe is connected into the jacket 61.

The opposite end of the continuing pipe section 56 preferably intersects and connects with a pipe 66 (Fig. 3) which is preferably horizontal and is preferably at a right angle to the pipe 56. Pipe 66 is also surrounded by a heating jacket 67 providing an annular heating space 68. The adjacent ends of these pipe sections and heating jackets are joined in a manner similar to the angular joint 47 thus providing protected pipe extensions 69, 70. Extension 69 is closed off with a removable cap 71 which may be removed when cleaning out the pipe section. Extension 70 carries the shut-off valve J hereinbefore mentioned.

The angularly disposed horizontal pipe section communicates with the lower end of a short vertical pipe section 73 (Figs. 1 and 3) having a surrounding heating jacket 74 providing a heating space 75 around the pipe section. The adjacent ends of these pipe sections are joined in a manner similar to the joint 47 thus providing protected pipe extensions 76 having removable pipe cleaning caps 77 secured to the outer ends thereof. It will thus be seen that the pipe line is provided at all angular intersections and connections with facilities for opening and cleaning out each individual section of the line.

Vertical pipe section 73 leads to the adhesive applying mechanism C and conveys the flowing adhesive into a jacketed container or reservoir 79 of the mechanism. For this purpose the upper end of the pipe section is threaded into the bottom of the reservoir. The upper end of the pipe section heating jacket 74 is secured to a jacket 81 which surrounds the reservoir 79 and provides a heating space 82.

The fluid heating medium used for maintaining the liquid or semi-liquid adhesive at a predetermined temperature is preferably introduced into the heating space 27 surrounding the vessel 11 by way of an inlet pipe 85 which is threaded into a side wall 25 of the supply tank heating jacket F. The inlet pipe leads from any suitable source of supply. Obviously, the heating medium is maintained at the desired determined temperature.

Besides circulating through the heating space 27 the heating fluid flows through the pipe line heating spaces 44, 52, by-pass 64, heating spaces 62, 68, 75 of the respective continuing jackets 43, 51, 61, 67, 74 and also through the heating space 82 around the adhesive reservoir 79 of the applying mechanism C. From the reservoir 79 the fluid may be discharged from the system by way of an outlet pipe 87 which is threaded into the heating jacket 81. The adhesive is thus maintained at a predetermined temperature from the time it enters the supply tank A until it is applied to the strip or web E by the applying mechanism C.

Regulation of the amount of adhesive which flows through the pipe line B is controlled by the valve H so that the adhesive in the applying mechanism reservoir 79 will be maintained at a predetermined level. The regulator valve H is preferably located in the vertical pipe section 41 of the pipe line at a position adjacent the supply tank A.

Regulator valve H (Figs. 1 and 2) includes a laterally projecting tubular member 91 which is preferably a part of the pipe section 41. The member 91 carries a close fitting valve element or plug 92 having a rounded end 93 which extends into the interior of the pipe section 41 and at a right angle thereto. A gasket 94 surrounds the valve element. This gasket is held in place by a sleeve 95 secured on the tubular member 91 and by a coupling 96 which is threaded on the sleeve. The coupling is screwed down tight on the gasket and thus squeezes it against the valve element.

At its outer end the valve element 92 is provided with a threaded stem 97 which terminates in a square head 98 adapted to receive a wrench. The stem is threaded through a stationary nut 99 seated in a recess 101 formed in the outer end of the coupling 96 and held against rotation by a cap 102 threaded on the outer end of the coupling 96.

Thus by applying a wrench to the square head 98 of the valve stem 97 the valve element 92 may be moved inwardly or outwardly relative to the pipe section 41. In this manner the passageway through the pipe 41 at the valve may be restricted to the desired degree or left unrestricted, thus regulating the flow of adhesive past the valve and through the pipe line B.

The shut-off valve J (Figs. 1 and 3), which is effective when the rollers D of applying mechanism C stop operating, is preferably located at the joint between the continuing horizontal pipe section 56 and the angularly disposed pipe section 66. It is in longitudinal alignment with the latter. For this purpose the extension 70 of the angularly disposed pipe section 66 carries a flanged sleeve 105. An air cylinder 106 is secured thereto. The air cylinder is provided with a head 107 having a tubular part 108 formed thereon.

Within the cylinder 106 is a piston 109 having a piston ring 111 engaging the cylinder walls in an air tight sliding fit. The piston is mounted on one end of a hollow piston rod 112 which slides in the extension 70 of the angularly disposed pipe section 66. This piston rod also constitutes a movable valve element. A long compression spring 114 is disposed within the hollow piston rod and extends through the part 108 in the cylinder head 107. The spring is held in place by a pin 115 which is secured in a nut cap 116 threaded over the end of the part 108.

Adjustment of the compression in the spring 114 may be had by turning the nut cap 116, the latter being locked in a desired adjusted position by a locknut 117. A gasket 119 surrounds the piston rod and is held in place between the flanged sleeve 105 and the air cylinder 106 and prevents leakage of air from the cylinder into the pipe line.

The normal or non-operated position of the valve element or piston rod 112 is shown in Fig. 3, it being fully retracted with its inner end out of the path of travel of the adhesive flowing from pipe section 56 into the angularly disposed pipe section 66. In this normal position the spring 114 is compressed and the piston is out or against the head 107 of the cylinder 106.

This normal non-operating position of the piston and piston rod is maintained by action of a suitable fluid, preferably compressed air in the cylinder. This air is introduced into the cylinder by way of a tube 121 one end of which is threaded into the side wall of the cylinder. The other end of the tube is threaded into the auxiliary air valve K and opens into a bore 122 formed in the valve. A small aperture 123 in the auxiliary valve casing leads from the bore to the outside of the casing. An air inlet pipe 124 threaded in the valve casing side wall also joints with the bore. This inlet pipe 124 leads from any suitable source of compressed air.

The auxiliary air valve K is formed as a part of an electric solenoid 131 which has a movable core 132. One end of the core fits into and has movement within the bore 122 of the auxiliary valve. This end of the core is provided with an annular channel 133. The opposite end of the core is backed up by a compression spring 134 held in place by a cap 135 threaded on an inner sleeve of the solenoid.

The solenoid 131 is electrically connected in circuit with an electric motor 130 (Fig. 1) which drives a pair of feeding rollers 136, 137 utilized in feeding web E through the adhesive applying mechanism C. This driving feature will now be explained.

Feeding rollers 136, 137 are mounted on shafts 138, 139 journaled in suitable bearings formed in a machine frame 141 which may support the adhesive reservoir 79. These shafts carry meshing spur gears 142 which effect a rotation of the feed rollers in unison. Shaft 139 also carries a pulley 143 which is driven by a belt 144 taking over a pulley 145 mounted on a rotor shaft 146 of the motor 130. Thus the motor by rotating the feeding rollers, draws the web E through the applying mechanism and between the rollers D.

The motor is operated by electrical energy passing through a starting and stopping switch 151 (see wiring diagram in Fig. 1). One terminal of this switch is connected by a wire 152 to the motor 130. The other terminal of the switch is connected by a wire 153 to the solenoid 131. The solenoid is also connected by a wire 154 to a source of electric energy such as a generator 155 which in turn is connected by a wire 156 to the motor 130.

Thus when the starting switch 151 is closed the circuit is completed and electric energy flows through the solenoid 131 to the motor 130. The motor is thus set in operation and also the solenoid is energized. Energization of the solenoid thus moves its core 132 into the position shown in Figs. 3, where it is held as long as the solenoid remains energized. When the core is in this position its annular channel 133 aligns with the inner end of the inlet pipe 124 and also the inner end of the tube 121 establishing communication between them. At the same time the extreme end of the core adjacent the channel blocks off the atmosphere port 123.

Compressed air from inlet pipe 124 thus passes through the air valve K into the cylinder 106 of the valve J and holds the piston 109 and its connecting rod or valve element 112 in retracted position, the forward end of the valve element being disposed entirely within the pipe line extension 70 so that it will not interfere with the flow of adhesive through the line. This is the normal operating position of each of the valve parts of valves J and K.

When it is desired to stop the feeding of the web E through the applying mechanism, the switch 151 is manually opened, the circuit is broken and electric energy ceases to flow from the generator. The solenoid 131 is thus de-energized. The solenoid spring 134 thereupon pushes the core 132 away from the cap 135 (Fig. 3) thus shifting its channel 133 out of alignment with the air inlet pipe 124. By this movement the air tube 121 is brought into communication with the atmosphere aperture 123 by means of the channel 133. Air within the cylinder 106 is thus released to the atmosphere.

This action permits the compression spring 114 in the piston rod or valve element 112 to push the latter forward into the pipe line B, the end of the valve element, as shown in dotted lines in Fig. 3, closing off communication between the pipe section 56 and the angularly disposed pipe section 66. The flow of adhesive through the line is thus stopped until such time as the solenoid 131 of the auxiliary valve K is again energized by starting of the motor 130 and the air pressure is again built up in the cylinder 106 of the shut-off valve J.

Obviously closing of the pipe line for preventing flow of adhesive therethrough does not in any way shut off flow of the heating medium in the various jacket spaces surrounding the adhesive. Therefore the adhesive will not harden in the line even though it has ceased to flow from the vessel 11 into the reservoir 79. Usually after a day's run the pipe lines, vessel and reservoir will be emptied of the adhesive and then all of the pipes can be easily cleaned out preparatory to closing down for the night.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A mechanism for maintaining thermoplastic adhesive in liquid form and at a predetermined temperature while conveying it to a point of application, comprising in combination a supply tank for the adhesive, a reservoir for receiving said adhesive, a pipe line connecting said supply tank with said reservoir, heating jackets disposed exteriorly of said supply tank, said pipe line and said reservoir and providing an enclosing space for the circulation of a fluid heating medium to maintain said adhesive at a predetermined temperature, devices in said reservoir for successively removing adhesive therefrom during its application to a surface, an axially reciprocable cut-off valve in said pipe line, means for closing said cut-off valve to stop the flow of adhesive between said supply tank and said reservoir when said reservoir adhesive removing devices stop operation, and fluid pressure means normally maintaining said cut-off valve in open position.

2. A mechanism for maintaining thermoplastic adhesive in liquid form and at a predetermined temperature while conveying it to a point of application, comprising in combination a supply tank for the adhesive, a reservoir for receiving said adhesive, a pipe line connecting said supply tank with said reservoir, heating jackets disposed exteriorly of said supply tank, said pipe line and said reservoir and providing an enclosing space for the circulation of a fluid heating medium to maintain said adhesive at a predetermined temperature, a roller in said reservoir for removing adhesive therefrom and for applying it to a web passed over said roller, means for rotating said roller, a spring pressed axially reciprocable cut-off valve in said pipe line, and electrically actuated means operable by said roller rotating means for rendering said spring effective to close said cut-off valve to stop the flow of adhesive between said supply tank and said reservoir when said roller stops rotating.

3. A mechanism for maintaining thermoplastic adhesive in liquid form and at a predetermined temperature while conveying it to a point of application, comprising in combination a supply tank for the adhesive, a reservoir for receiving said adhesive, a pipe line connecting said supply tank with said reservoir, heating jackets disposed exteriorly of said supply tank, said pipe line and said reservoir and providing an enclosing space for the circulation of a fluid heating medium to maintain said adhesive at a predetermined temperature, a pair of rollers adapted to feed a web between them, one of said rollers being located in said reservoir for removing adhesive therefrom and for applying it to the web, means for rotating said rollers, an axially reciprocable cut-off valve in said pipe line, electrical means including a solenoid and operable by said roller rotating means for closing said cut-off valve to stop the flow of adhesive between said supply tank and said reservoir when said roller stops rotating, and fluid pressure means normally maintaining said cut-off valve in open position.

4. A mechanism for maintaining thermoplastic adhesive in liquid form and at a predetermined temperature while conveying it to a point of application, comprising in combination a supply tank for the adhesive, a reservoir for receiving said adhesive, a pipe line connecting said supply tank with said reservoir, heating jackets disposed exteriorly to said supply tank, said pipe line and said reservoir and providing an enclosing space for the circulation of a fluid heating medium to maintain said adhesive at a predetermined temperature, a roller in said reservoir for removing adhesive therefrom and for applying it to a web passed over said roller, means for rotating said roller, an axially reciprocable spring pressed cut-off valve in said pipe line, an axially reciprocable pressure fluid valve cooperating with said cut-off valve and controlling the actuation of said cut-off valve through the introduction and release of a pressure fluid into and from the latter valve, and electric means including a solenoid operable by said roller rotating means and acting on said fluid pressure valve releasing said fluid pressure to render said spring effective to close said cut-off valve to stop the flow of adhesive between said supply tank and said reservoir when said roller stops rotating.

5. A mechanism for maintaining thermoplastic adhesive in liquid form and at a predetermined temperature while conveying it from place to place, comprising in combination, a supply tank for holding the adhesive, a reservoir for receiving the adhesive from said supply tank and having an adhesive applying roll mounted therein for conveying adhesive therefrom, means for rotating said adhesive applying roll, a pipe line having intersecting right angular joints connecting said supply tank with said reservoir, heating jackets spaced from and surrounding said supply tank, said pipe line and said reservoir, the enclosed space within said jackets being adapted to be filled with a fluid heating medium which is circulated therein to maintain said adhesive at a predetermined temperature, an automatically closing shut-off valve in said pipe line and having holding means normally retaining said valve in open position to permit the flow of adhesive from said tank to said reservoir, means urging said shut-off valve to closed position and an auxiliary valve controlling said shut-off valve, means operatively uniting said auxiliary valve with said roll rotating means, said auxiliary valve being actuated through said operatively uniting means upon stoppage of said rotating means to render said holding means ineffective to further maintain said shut-off valve in open position, whereby flow of adhesive through said pipe line to said reservoir is cut off by the automatic closing of said shut-off valve by said valve closing means.

6. A mechanism for maintaining thermoplastic adhesive in liquid form and at a predetermined temperature while conveying it from place to place, comprising in combination, a supply tank for holding the adhesive, a reservoir for receiving the adhesive from said supply tank and having an adhesive applying roll mounted therein for conveying adhesive therefrom, means for rotating said adhesive applying roll, a pipe line made up of angularly disposed and continuing sections connecting said supply tank with said reservoir, said sections having terminal ends united in an intersecting right angular joint, the terminal end of each joint having a removable closure secured thereto to provide free access to the interior of each pipe section to permit cleaning while at the same time leaving the joint undisturbed, an automatically closing shut-off valve in said pipe line and having holding means normally retaining said valve in open position to permit the flow of adhesive from said tank to said reservoir, means urging said shut-off valve to closed position and an auxiliary valve controlling said shut-off valve, means operatively uniting said auxiliary valve with said roll rotating means, said auxiliary valve being actuated through said operatively uniting means upon stoppage of said rotating means to render said holding means ineffective to further maintain said shut-off valve in open position, whereby flow of adhesive through said pipe line to said reservoir is cut off by the automatic closing of said shut-off valve by said valve closing means.

7. A mechanism for maintaining thermoplastic adhesive in liquid form and at a predetermined temperature while conveying it from place to place, comprising in combination: a supply tank for holding the adhesive, a reservoir for receiving the adhesive from said supply tank and having an adhesive applying roll disposed therein, means for rotating said roll, a pipe line made up of right angularly disposed intersecting continuing sections connecting said supply tank with said reservoir, a pipe extension at each corner of the line, a removable cap for closing off the end of each extension, said extensions permitting free access to the interior of said pipe sections when the caps are removed so that the pipe line may be readily cleaned out along its entire length, means for heating the supply tank, pipe line and reservoir, a shut-off valve in said pipe line normally permitting flow of adhesive from said tank to said reservoir, means for holding said valve in open position, an auxiliary valve for controlling said shut-off valve, means operatively uniting said auxiliary valve with said roll rotating means, said auxiliary valve being actuated through said operatively uniting means upon stoppage of said rotating means for rendering said holding means ineffective to further maintain said shut-off valve in open position, and means operative upon actuation of said auxiliary valve for automatically closing said shut-off valve to cut off further flow of adhesive through said pipe line.

8. A mechanism for maintaining thermoplastic adhesive in liquid form and at a predetermined temperature while conveying it from place to place, comprising in combination, a supply tank for holding the adhesive, a reservoir for receiving the adhesive from said supply tank and having an adhesive applying roll mounted therein for conveying adhesive therefrom, a pipe line made up of right angularly disposed intersecting continuing sections connecting said supply tank with said reservoir, heating jackets spaced from and surrounding said supply tank, said pipe line and said reservoir, the enclosed space within said jackets being adapted to be filled with a fluid heating medium which is circulated therein to maintain said adhesive at a predetermined temperature, said pipe sections each having axial extensions at each corner in the pipe line which project outside of the surrounding pipe jackets at such position, a removable cap for closing the end of each extension during flow of the adhesive through the pipe line, said extensions affording free access to the interior of said pipe sections when the caps are removed so that each pipe section may be readily cleaned out along its entire length, a spring-pressed shut-off valve in said pipe line, means for normally holding said valve in open position to permit flow of adhesive from said tank to said reservoir, and means controlling said shut-off valve and operative when said applying roll stops rotating for rendering said holding means ineffective, whereby said valve is closed by its spring to cut off further flow of adhesive through said pipe line.

9. A mechanism for maintaining thermoplastic adhesive in liquid form and at a predetermined temperature while conveying it from place to place, comprising in combination, a supply tank for melting the adhesive, a reservoir for receiving the melted adhesive and having an adhesive applying roll mounted therein for conveying adhesive therefrom, electrically energized means for rotating said roll, a pipe line connecting said supply tank with said reservoir, heating jackets spaced from and surrounding said supply tank and said reservoir and enclosing a space around them for the circulation of a fluid heating medium to heat and maintain the adhesive within said tank and reservoir at a predetermined temperature, said pipe line being composed of right angularly disposed intersecting sections joined together in a continuous conduit, heating jackets spaced from and surrounding the pipe sections and providing a passage for a fluid heating medium for maintaining the adhesive in the pipe line at a predetermined temperature, means for by-passing the heating fluid from one pipe heating jacket to another at the junction of each pipe section, an automatically closing shut-off valve in said pipe line and having fluid pressure means normally holding the same in open position to permit flow of adhesive from said tank to said reservoir, and an electrically actuated auxiliary valve electrically connected with said roll rotating means and controlling said shut-off valve, said valve being adapted to be actuated when the said electrical connections are broken and said adhesive applying roll stops rotating for rendering said fluid pressure means ineffective to further maintain said shut-off valve in open position, whereby the flow of adhesive through said pipe line to said reservoir is cut off by the autmatic closing of said valve.

10. A mechanism for maintaining thermoplastic adhesive in liquid form and at a predetermined temperature while conveying it from one place to another, comprising in combination: a supply tank for the adhesive, a reservoir for receiving said adhesive and having an adhesive applying roll mounted therein for conveying adhesive therefrom, means for rotating said roll, a pipe line connecting said supply tank with said reservoir, heating jackets disposed exteriorly of said supply tank, said pipe line and said reservoir and providing an enclosing space for the circulation of a fluid heating medium by means of which said adhesive may be maintained at a predetermined temperature, a manually operable axially reciprocable valve extending through a said heating jacket and into the interior of said pipe line for controlling the flow of adhesive from said supply tank to said reservoir to maintain a predetermined level of adhesive in the reservoir, a second axially reciprocable automatically closing valve located in said pipe line for controlling the flow of adhesive therethrough, means normally holding said second mentioned valve in open position, means urging said second valve to closed position, and means operatively uniting said second valve with said roll rotating means, said second valve being actuated through said operatively uniting means upon stoppage of said rotating means to render said holding means ineffective to further maintain said second mentioned valve in open position, whereby the flow of adhesive through said pipe line is cut off by the automatic closing of said valve.

HERBERT F. COX, Jr.
HOWARD M. HILL.